US008233207B2

(12) United States Patent
Hastings et al.

(10) Patent No.: US 8,233,207 B2
(45) Date of Patent: Jul. 31, 2012

(54) METHOD AND APPARATUS FOR REACTIVE OPTICAL CORRECTION OF GALVANO MOTOR SCANNING HEADS

(75) Inventors: Stephen Hastings, Munich (DE); Stephen Coles, Worplesdon (GB)

(73) Assignee: Abariscan GmbH, Munich (DE)

( * ) Notice: Subject to any disclaimer, the term of this patent is extended or adjusted under 35 U.S.C. 154(b) by 257 days.

(21) Appl. No.: 11/914,981

(22) PCT Filed: Aug. 6, 2007

(86) PCT No.: PCT/EP2007/058154
§ 371 (c)(1),
(2), (4) Date: May 20, 2010

(87) PCT Pub. No.: WO2009/018857
PCT Pub. Date: Feb. 12, 2009

(65) Prior Publication Data
US 2010/0220373 A1    Sep. 2, 2010

(51) Int. Cl.
*G02B 26/08*    (2006.01)
(52) U.S. Cl. .................................................. 359/199.3
(58) Field of Classification Search .... 359/198.1–199.4, 359/200.6–200.8, 202.1, 221.2, 223.1–225.1, 359/226.2, 904, 290–295, 838, 846, 871, 359/872; 250/204, 559.06, 559.29, 230, 250/234; 347/255–260; 353/39, 98–99; 385/15–18, 22; 398/12, 19, 45
See application file for complete search history.

(56) References Cited

U.S. PATENT DOCUMENTS

| 5,133,987 A | 7/1992 | Spence et al. |
| 5,430,666 A | 7/1995 | DeAngelis et al. |
| 6,615,099 B1 | 9/2003 | Muller et al. |
| 6,816,302 B2 * | 11/2004 | Sandstrom et al. ............ 359/291 |
| 7,297,971 B2 * | 11/2007 | Van Bilsen et al. ........ 250/559.3 |

FOREIGN PATENT DOCUMENTS

| DE | 44 37 284 A1 | 4/1996 |
| EP | 0 339 402 A1 | 11/1989 |

* cited by examiner

*Primary Examiner* — Jennifer L. Doak
(74) *Attorney, Agent, or Firm* — Fraser Clemens Martin & Miller LLC; J. Douglas Miller

(57) ABSTRACT

This invention relates to a method of optical correction of field position distortions created by galvano motor scanning heads. In addition, the invention relates to the apparatus and method to achieve a calibration of said field positions to overcome said distortions generated by the delivery optics within a galvano motor scanning head using a pre-calibrated target that may be positioned into a registration or 'lay' system for ease of identifying and measuring said series of marks by removal and replacing said pre-calibrated target into said registration or 'lay' system, pre-determined logic means to generate a series of marks on said pre-calibrated target using said galvano motor scanning head and said galvano motor scanning head control apparatus and operator input so that said logic means may calculate from a minimum number of operator entries corresponding to said series of marks on said pre-calibrated target that may be positioned into said registration or 'lay' system for ease of identifying and measuring said series of marks by removal and replacing said pre-calibrated target into said registration or 'lay' system a full field correction of the field position distortions taking into account all beam or laser beam, mounting, alignment and parallelity intolerances to generate corrected galvano motor position control optical correction data reactive to the exact parameters of an individual laser, delivery optic/s, galvano motor scanning head and target plane set-up.

20 Claims, 11 Drawing Sheets

METHOD AND APPARATUS FOR REACTIVE OPTICAL CORRECTION OF GALVANO MOTOR SCANNING HEADS

CROSS-REFERENCE TO RELATED APPLICATIONS

This application claims priority to PCT International application PCT/EP2007/058154, filed Aug. 6, 2007, the entire disclosure of which is hereby incorporated herein by reference.

FIELD OF THE INVENTION

This invention relates to a method of optical correction of field position distortions created by galvano motor scanning heads. In addition, the invention relates to the apparatus and method to achieve a calibration of said field positions to overcome said distortions generated by the delivery optics within a galvano motor scanning head using a pre-calibrated target that may be positioned into a registration or 'lay' system for ease of identifying and measuring said series of marks by removal and replacing said pre-calibrated target into said registration or 'lay' system, pre-determined logic means to generate a series of marks on said pre-calibrated target using said galvano motor scanning head and said galvano motor scanning head control apparatus and operator input so that said logic means may calculate from a minimum number of operator entries corresponding to said series of marks on said pre-calibrated target that may be positioned into said registration or 'lay' system for ease of identifying and measuring said series of marks by removal and replacing said pre-calibrated target into said registration or 'lay' system a full field correction of the field position distortions taking into account all beam or laser beam, mounting, alignment and parallelity intolerances to generate corrected galvano motor position control optical correction data reactive to the exact parameters of an individual laser, delivery optic/s, galvano motor scanning head and target plane set-up.

BACKGROUND OF THE INVENTION

Traditional galvano motor scanning head correction data is pre-calculated based upon the optical design parameters of the optics used within said galvano motor scanning head and is limited by several factors:

Firstly, in the case of pre-objective scanning where a flat-field or f-Theta or telecentric lens or lenses are used and because the pre-calculated or proactive galvano motor driven scanning head correction data is commonly generated by knowing the galvano motor driven deflection mirror separation distances, the galvano motor driven deflection mirror scanning angles, the final galvano motor driven mirror separation distance to said flat-field or f-Theta or telecentric lens or lenses and the design parameters of said flat-field or f-Theta or telecentric lens or lenses any pre-calculated or proactive galvano motor driven scanning head correction data will not take into account any intolerances of the beam or laser beam or galvano motor mounting or optical mounting or parallellity between the galvano motor driven scanning head and the target plane.

Secondly, in the case of post-objective scanning where an active or passive telescope comprising a series of lenses is used, and because the pre-calculated or proactive galvano motor driven scanning head correction data is commonly generated by knowing the telescope lens element design parameters and separation distances, the galvano motor driven deflection mirror separation distances, the galvano motor driven deflection mirror scanning angles, and the final galvano motor driven mirror separation distance to the target plane any pre-calculated or proactive galvano motor driven scanning head correction data will not take into account any intolerances of the beam or laser beam or galvano motor mounting or optical mounting or paralellity between the galvano motor driven scanning head and the target plane.

Third, because said process of pre-objective or post-objective galvano motor scanning head correction data is pre-calculated and hence proactive any field distortions remaining after said pre-objective or post-objective galvano motor scanning head correction data is generated and applied due to any intolerances must be further corrected by a complex process of marking, measuring and inputting fresh data into said pre-objective or post-objective galvano motor scanning head correction data to apply further corrections to perfectly match said pre-objective or post-objective galvano motor scanning head correction data to further correct for said intolerances to achieve distortion free targeting.

Fourth, because said pre-objective or post-objective galvano motor scanning head correction data is pre-calculated and hence proactive said pre-objective or post-objective galvano motor scanning head correction data must be generated knowing the design parameters of optics that optic manufacturers do not commonly wish to divulge.

SUMMARY OF THE INVENTION

A method is provided for the optical correction of field position distortions created by galvano motor scanning heads to achieve a calibration of said field position to overcome said distortions generated by the delivery optics within a galvano motor scanning head using a pre-calibrated target that may be positioned into a registration or 'lay' system for ease of identifying and measuring a series of marks by removal and replacing said pre-calibrated target into said registration or 'lay' system, pre-determined logic means to generate said series of marks on said pre-calibrated target using said galvano motor scanning head and galvano motor scanning head and laser control apparatus, and operator inputs so that said logic means can calculate from a minimum number of operator entries into said logic means corresponding to said series of marks on said pre-calibrated target a full field correction of the field position distortions taking into account all beam or laser beam, mounting, alignment and parallelity intolerances to generate corrected galvano motor position control optical correction data reactive to the exact parameters of an individual laser, delivery optic/s, galvano motor scanning head and target plane set-up and without the need for any design parameters or data of the optics or optical set-up in use.

In this method the operator constructs or sets or positions beam or laser beam generation apparatus with or without beam or laser beam delivery optics so that said laser beam enters a galvano motor scanning head to be deflected by galvano motor driven optics and commonly mirrors to a target plane on which is positioned a pre-calibrated target.

With the complete apparatus set in position the operator may then run a series of logic commands to generate marks on the pre-calibrated target using beam or laser beam and galvano motor scanning head control apparatus to set the optimum working distance between the galvano motor scanning head and the target plane and the optimum parallelity between said galvano motor scanning head and said target plane.

With the galvano motor scanning head and target plane fixed into position a series of logic commands to generate marks on the pre-calibrated target using beam or laser beam and galvano motor scanning head control apparatus may be performed to mark a minimum number of points on said pre-calibrated target that once identified, measured and inputted into said logic means by an operator may be calculated by said logic means to adjust for and set the combined galvano motor central or middle scanning angle position/s or gain and/or individual galvano motor scale or offset/s.

With the galvano motor scanning head and target plane still fixed in position a further series of logic commands to generate marks on the pre-calibrated target using beam or laser beam and galvano motor scanning head control apparatus may be performed to mark a minimum number of points on said pre-calibrated target that once identified, measured and inputted into said logic means by an operator can be calculated by said logic means to adjust for optical distortions and set combined galvano motor correction data to correct for said optical distortions.

With the galvano motor scanning head and target plane remaining fixed in position a final series of logic commands to generate a design to be marked on said pre-calibrated target using beam or laser beam and galvano motor scanning head control apparatus may be performed to mark said design on said pre-calibrated target that once identified, measured and inputted into said logic means by an operator may be calculated by said logic means to adjust for and set the combined galvano motor scale of the optical distortion correction data.

It is important to note that optical manufacturing techniques for the type and design of optics commonly used within galvano motor scanning head technology cannot produce irregular surface results at each optical element surface and so the linearity of for example a semi-hemispherical surface at a particular optical element surface will have a regularity that can only be decentred or tilted about a beam or laser beam and this is of prime importance to the understanding of reverse calculating by logic means for example a row of four marks that when joined represent a curve or arc that can only follow said particular curve or arc and by calculating by said logic means where said curve or arc is virtual to each position within a virtual grid within said logic means said curve or arc can be corrected at far greater resolution to produce optical correction data by said logic means that may then be used by said logic means to provide a perfectly corrected processing result using a beam or laser beam through said galvano motor scanning head at said target plane.

DETAILED DESCRIPTION OF THE PREFERRED EMBODIMENT

Figure 1:
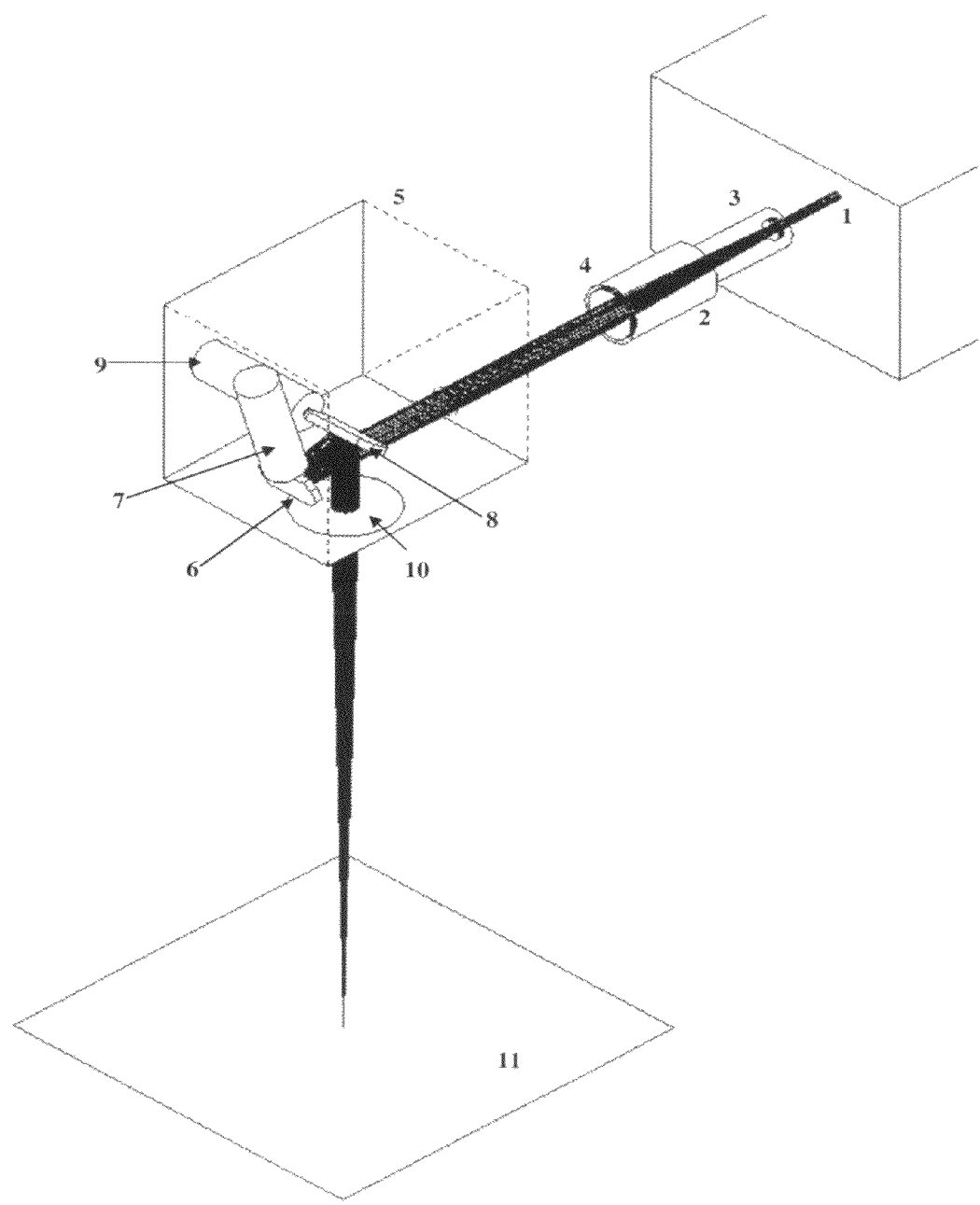
FIG. 1 is an isometric diagram depicting a typical layout of the components required to deliver a beam or laser beam by galvano motor scanning head means to a target plane.

As depicted in FIG. 1, a beam or laser beam (1) being diverging, collimated or converging enters a galvano motor scanning head (5) either directly or first passing through beam or laser beam delivery optics in this embodiment shown as a two-element beamexpander (2) comprising in this embodiment an entry optical element (3) to expand said beam or laser beam (1) and an output collimating optical element (4) so that the beam or laser beam (1) then inside said galvano motor scanning head (5) in this embodiment deflecting off a first or X galvano motor driven mirror (6) attached to a first or X galvano motor (7) and steered to deflect off a second or Y galvano motor driven mirror (8) attached to a second or Y galvano motor (9) and steered to deflect to transmit through in this pre-objective scanning embodiment a flat-field or f-Theta or telecentric lens or lenses (10) to focus at a target plane (11).

Figure 2:
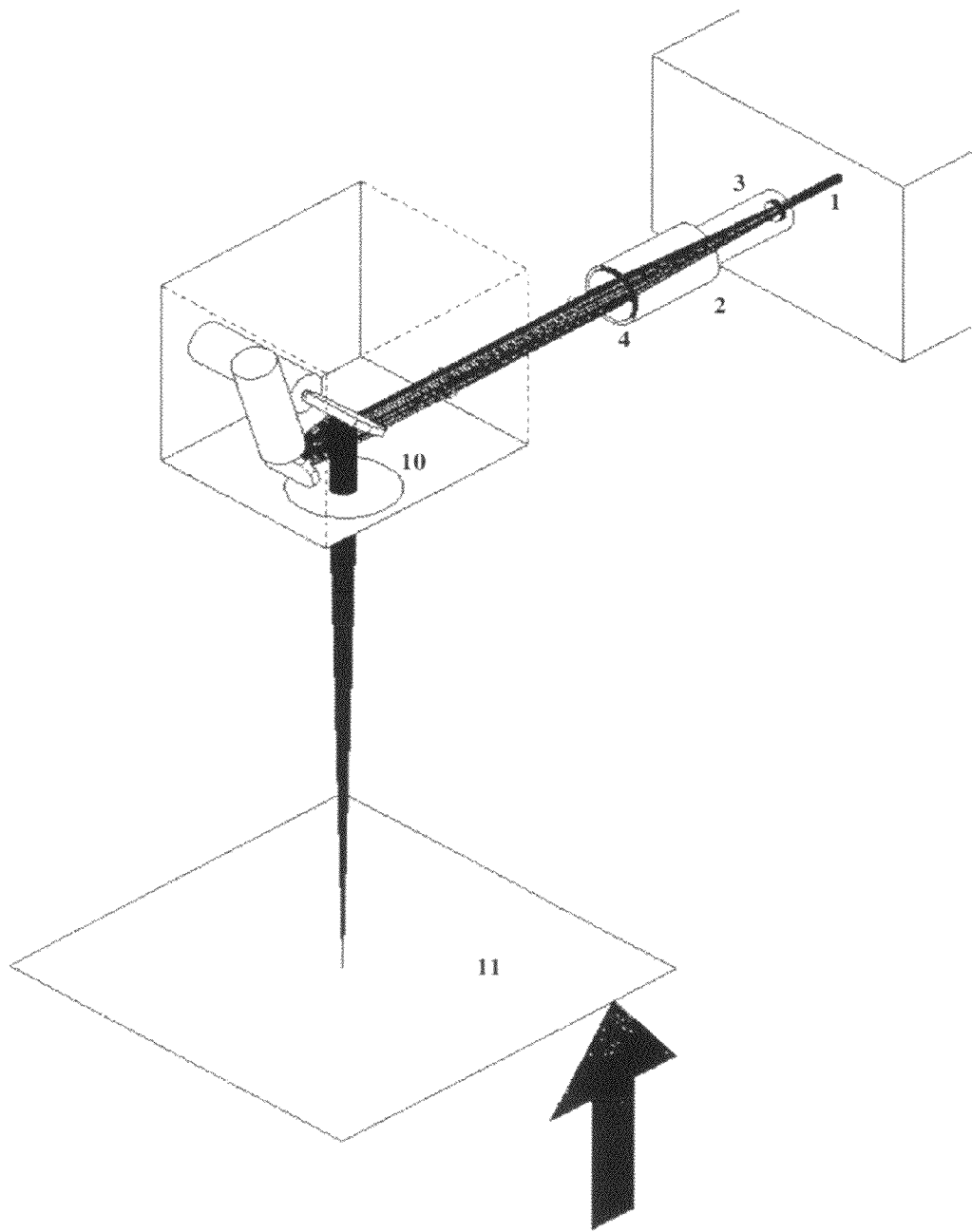
FIG. 2 is an isometric diagram depicting a typical layout of the components required to deliver a beam or laser beam by galvano motor scanning head means to a target plane where a converging beam entering said galvano motor scanning head will shorten the focal length of the system.

As depicted in FIG. 2, if said beam or laser beam (1) is converging entering a galvano motor scanning head (5) either directly or first passing through beam or laser beam delivery optics in this embodiment shown as a two-element beamexpander (2) comprising in this embodiment an entry optical element (3) to expand said beam or laser beam (1) and an output collimating optical element (4) the beam or laser beam (1) converging either because of the parameters of said beam or laser beam (1) or the parameters of said delivery optics or parameters of said beamexpander (2) due to incorrect separation or design of in this embodiment the entry optical element (3) to expand said beam or laser beam (1) and/or output collimating optical element (4) then in this pre-objective scanning embodiment a flat-field or f-Theta or telecentric lens or lenses (10) will shorten the focal length to a target plane (11).

Figure 3:
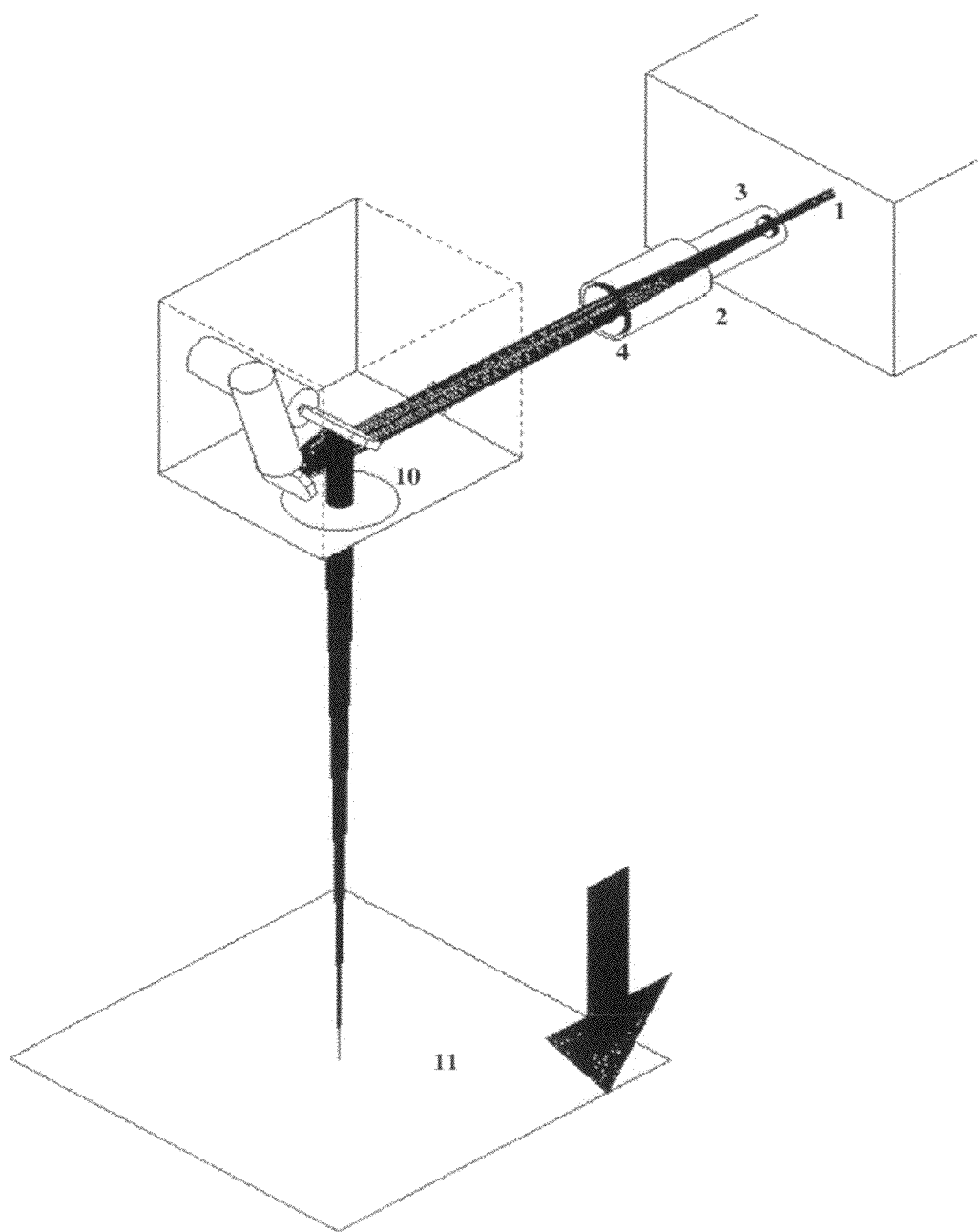
FIG. 3 is an isometric diagram depicting a typical layout of the components required to deliver a beam or laser beam by galvano motor scanning head means to a target plane where a diverging beam entering said galvano motor scanning head will lengthen the focal length of the system.

As depicted in FIG. 3, if said beam or laser beam (1) is diverging entering a galvano motor scanning head (5) either directly or first passing through beam or laser beam delivery optics in this embodiment shown as a two-element beamexpander (2) comprising in this embodiment an entry optical element (3) to expand said beam or laser beam (1) and an output collimating optical element (4) the beam or laser beam (1) diverging either because of the parameters of said beam or laser beam (1) or the parameters of said delivery optics or parameters of said beamexpander (2) due to incorrect separation or design of in this embodiment the entry optical element (3) to expand said beam or laser beam (1) and/or output collimating optical element (4) then in this pre-objective scanning embodiment a flat-field or f-Theta or telecentric lens or lenses (10) will lengthen the focal length to a target plane (11).

Figure 4:
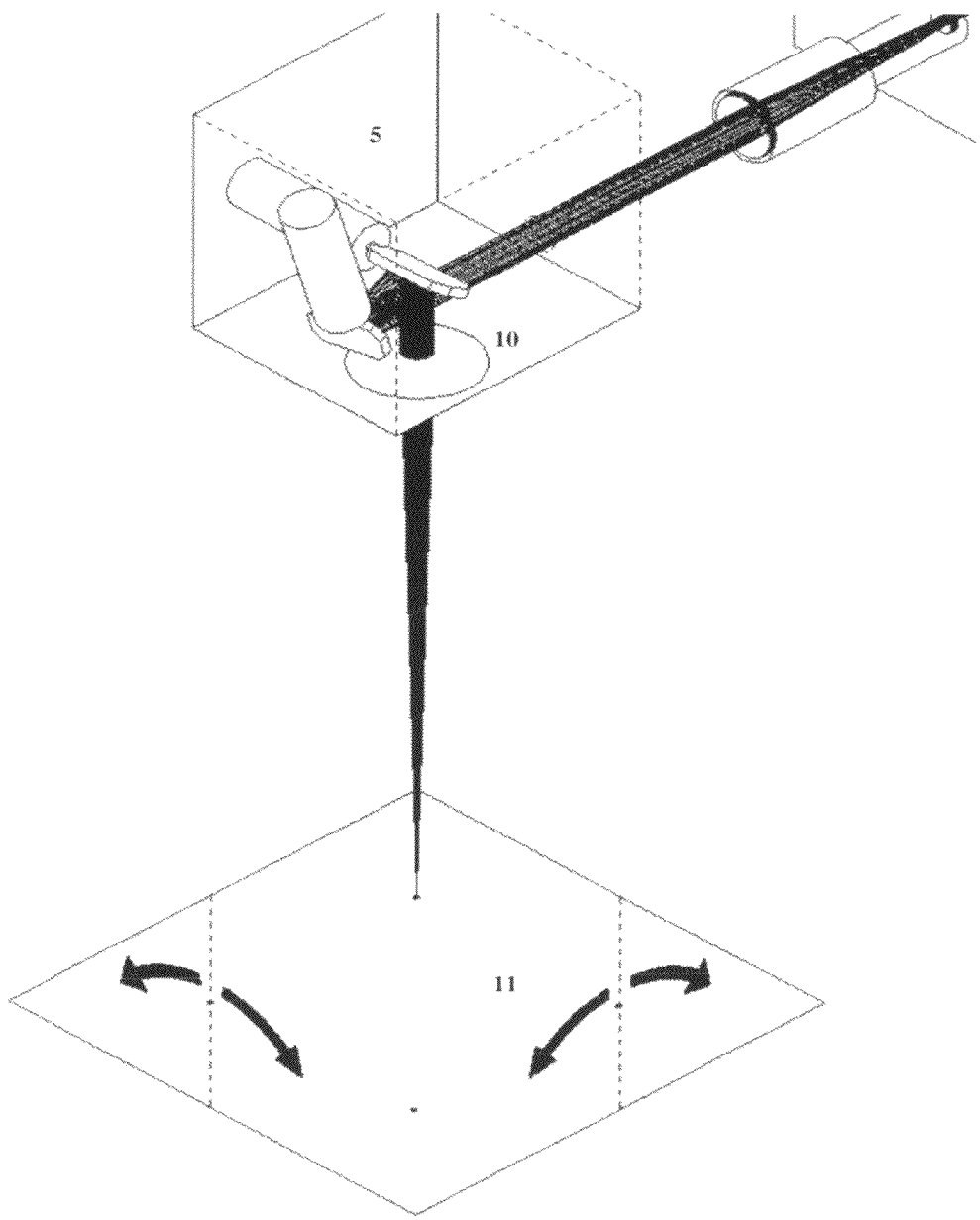
FIG. 4 is an isometric diagram depicting a typical layout of the components required to deliver a beam or laser beam by galvano motor scanning head means to a target plane where the parallelity of said galvano motor scanning head to said target plane will affect field distortions and/or overall focus.

As depicted in FIG. 4, if said beam or laser beam (1) enters a galvano motor scanning head (5) either directly or first passing through beam or laser beam delivery optics in this embodiment shown as a two-element beamexpander (2) comprising in this embodiment an entry optical element (3) to expand said beam or laser beam (1) and an output collimating optical element (4) then inside said galvano motor scanning head (5) in this embodiment deflecting off a first or X galvano motor driven mirror (6) attached to a first or X galvano motor (7) and steered to deflect off a second or Y galvano motor driven mirror (8) attached to a second or Y galvano motor (9) and steered to deflect to transmit through in this pre-objective scanning embodiment a flat-field or f-Theta or telecentric lens or lenses (10) to focus at a target plane (11) may not reach said target plane with perfect parallelity to said galvano motor scanning head (5).

Figure 5:
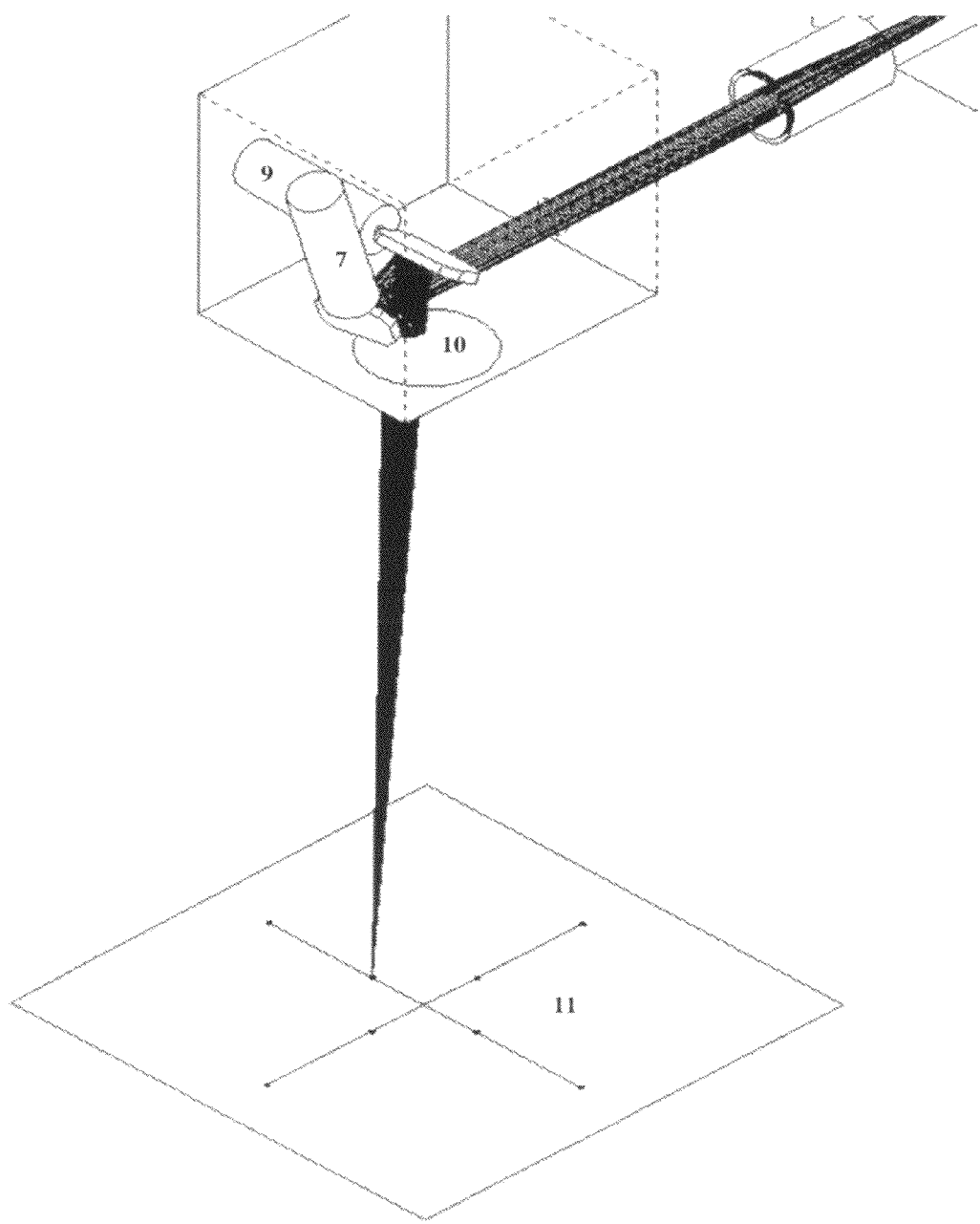
FIG. 5 is an isometric diagram depicting a typical layout of the components required to deliver a beam or laser beam by galvano motor scanning head means to a target plane where a series of crossing marks will be marked on a pre-calibrated target at the target plane that once identified, measured and inputted into logic means by an operator can be calculated by said logic means to adjust for and set the combined galvano motor central or middle scanning angle position/s or gain and/or individual galvano motor scale or offset/s.

As depicted in FIG. 5, when said beam or laser beam (1) is targeted in this pre-objective scanning embodiment to focus at a target plane (11) a series of marks may be made by an operator running a command or routine by logic means onto a pre-calibrated target that said operator can then identify, measure and input into said logic means to be calculated by said logic means to adjust for and set the combined galvano motor central or middle scanning angle position/s or gain and/or individual galvano motor scale or offset/s.

Figure 6:
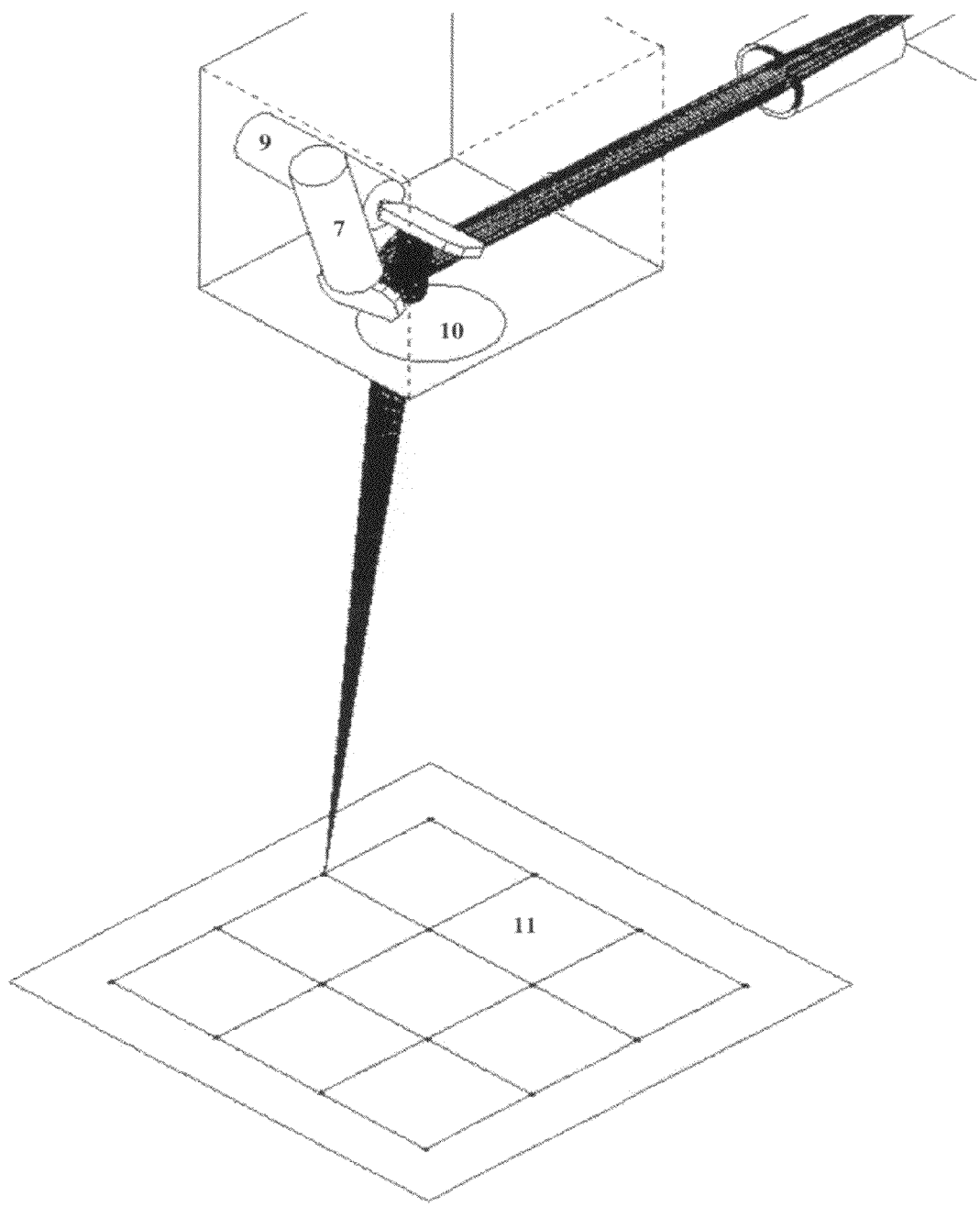
FIG. 6 is an isometric diagram depicting a typical layout of the components required to deliver a beam or laser beam by galvano motor scanning head means to a target plane where logic commands to generate a series of marks on the pre-calibrated target using beam or laser beam and galvano motor scanning head control apparatus may be performed to mark a minimum number of points on the pre-calibrated target that once identified, measured and inputted into a logic means by an operator can be calculated by said logic means to adjust for optical distortions and set a combined galvano motor correction data to correct for said optical distortions.

As depicted in FIG. 6, when said beam or laser beam (1) is targeted in this pre-objective scanning embodiment to focus at a target plane (11) a series of marks may be made by an operator running a command or routine by logic means onto a pre-calibrated target that said operator can then identify, measure and input into said logic means to be calculated by said logic means to adjust for optical distortions and set combined galvano motor correction data to correct for said optical distortions.

Therefore in a pre-objective scanning embodiment the beam or laser beam generation apparatus may be fixed into position to output a beam or laser beam (1) that may be aligned directly to input a galvano motor scanning head (5) or may use beam or laser beam delivery optics in this embodiment shown as a two-element beamexpander (2) comprising in this embodiment an entry optical element (3) to expand said beam or laser beam (1) and an output collimating optical element (4) the beam or laser beam (1) then inside said galvano motor scanning head (5) in this embodiment deflecting off a first or X galvano motor driven mirror (6) attached to a first or X galvano motor (7) and steered to deflect off a second or Y galvano motor driven mirror (8) attached to a second or Y galvano motor (9) and steered to deflect to transmit through in this pre-objective scanning embodiment a flat-field or f-Theta or telecentric lens or lenses (10) to focus at a target plane (11).

Figure 7:
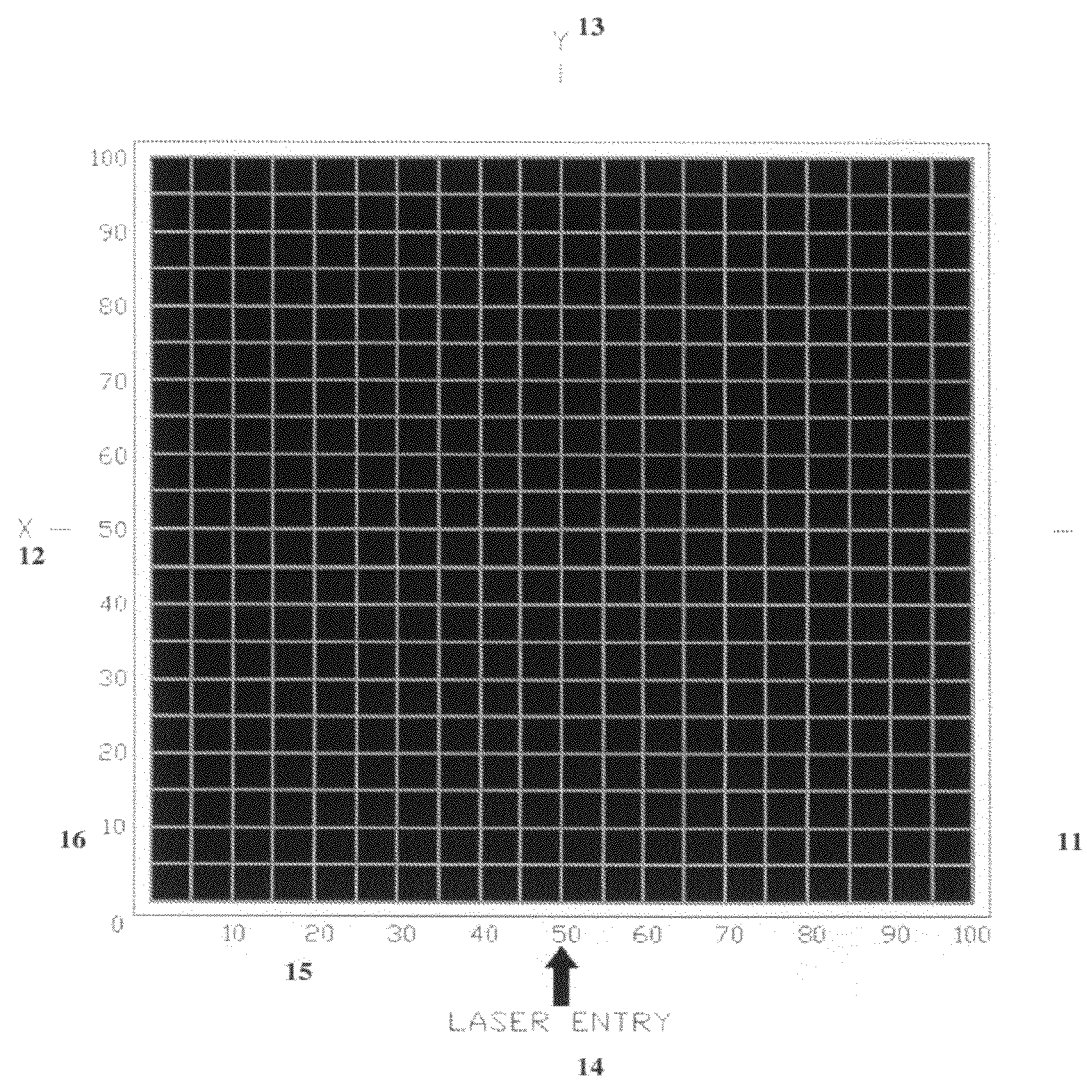
FIG. 7 is a plan diagram depicting one embodiment of a pre-calibrated target layout.

The operator may then position a pre-calibrated target (11) as depicted in FIG. 7 that may be positioned into a registration or 'lay' system for ease of identifying and measuring said series of marks by removal and replacing said pre-calibrated target into said registration or 'lay' system at the target plane ready to begin the sequence of events that will ultimately lead to the creation of reactive optical correction data and where in this embodiment said pre-calibrated target (11) will be of a material than can be marked by said beam or laser beam (1) and in this embodiment denoting which is the first or X-axis (12) which is the second or Y-axis (13) which is the beam or laser beam entry direction (14) and pre-marked with in this embodiment a pre-calibrated grid of lines for the first or X-axis (16) and pre-marked with in this embodiment a pre-calibrated grid of lines for the second or Y-axis (15).

The aforementioned sequence of events being pre-calculated to offer minimum complexity of what is in effect a complex operation may be in this embodiment be logic means representing a software or programme or 'Wizard' that may in this embodiment ask the operator to perform a series of relatively simple tasks including entering identified and/or measured marks generated at the pre-calibrated target (11) into said logic means via in this embodiment a series of data entry fields to be calculated by said logic means to adjust for optical distortions and set a combined galvano motor correction data to correct for said optical distortions.

The operator must first set the entire apparatus to ensure optimum focal length and this may be performed manually or by using a first or first pre-stage of the alignment operation and may in this embodiment be by logic means representing a software or programme or 'Wizard' that may in this embodiment once started ask the operator to position the pre-calibrated target (11) or any other target representing the target plane position at a distance from the galvano motor scanning head (5) and then fire a compatibly short duration of beam or laser beam (1) with in this embodiment galvano motor control apparatus (not shown) maintaining a first or X galvano motor driven mirror (6) attached to a first or X galvano motor (7) and steered to deflect off a second or Y galvano motor driven mirror (8) attached to a second or Y galvano motor (9) in their respective central scanning positions in this embodiment set during the construction and pre-calibration of said galvano motor scanning head (5) and then closing and opening said distance between said galvano motor scanning head (5) and said target (11) until the optimum focal distance is found taking into account all beam or laser beam, mounting and alignment intolerances.

Figure 8:
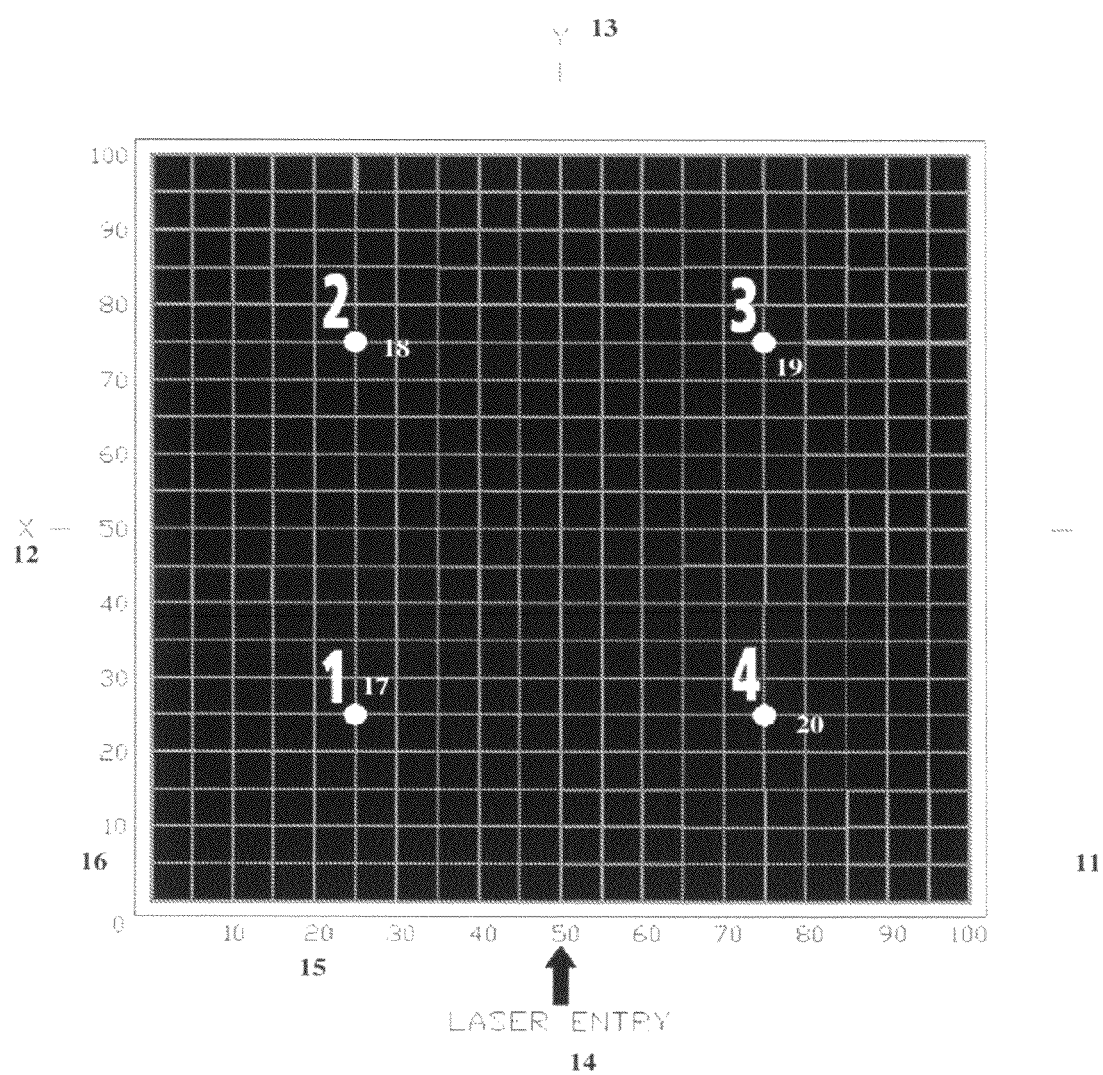
FIG. 8 is a plan diagram depicting one embodiment of a pre-calibrated target layout showing marks generated by logic means to assist an operator to find and set the optimum parallelity between a galvano motor scanning head and a target plane.

The operator may then set the entire apparatus to ensure optimum parallelity between the galvano motor scanning head (5) and the target (11) and this may be performed manually or by using a second or second pre-stage of the alignment operation and may in this embodiment be by logic means representing a software or programme or 'Wizard' that may in this embodiment once completion of the first or first pre-stage of setting focal distance ask the operator to adjust the position of the pre-calibrated target (11) or any other target representing the target plane position so that the focal distance from the galvano motor scanning head (5) to the target (11) is maintained and then fire compatibly short durations of beam or laser beam (1) with in this embodiment galvano motor control apparatus (not shown) steering a first or X galvano motor driven mirror (6) attached to a first or X galvano motor (7) and steered to deflect off a second or Y galvano motor driven mirror (8) attached to a second or Y galvano motor (9) and scanned or steered to mark at four positions as depicted in FIG. 8 (17, 18, 19, 20) and the operator then tilts the pre-calibrated target (11) or any other target representing the target plane position about the first or X-axis (12) and second or Y-axis (13) until all four marks at the four positions (17, 18, 19, 20) have the same size or quality and the optimum parallelity between said galvano motor scanning head (5) said target (11) is found.

At this stage the apparatus comprising galvano motor scanning head (5) and target plane (11) may be fixed in their now optimum positions ready to commence the reactive optical correction sequence of events that will produce optimum optical correction data for and by said apparatus taking into account any intolerances of the beam or laser beam or galvano motor mounting or optical mounting and without any requirement to understand or have available galvano motor driven deflection mirror separation distances, galvano motor driven deflection mirror scanning angles, final galvano motor driven mirror separation distance to in this embodiment said flat-field or f-Theta or telecentric lens or lenses and design parameters of said flat-field or f-Theta or telecentric lens or lenses.

Figure 9:
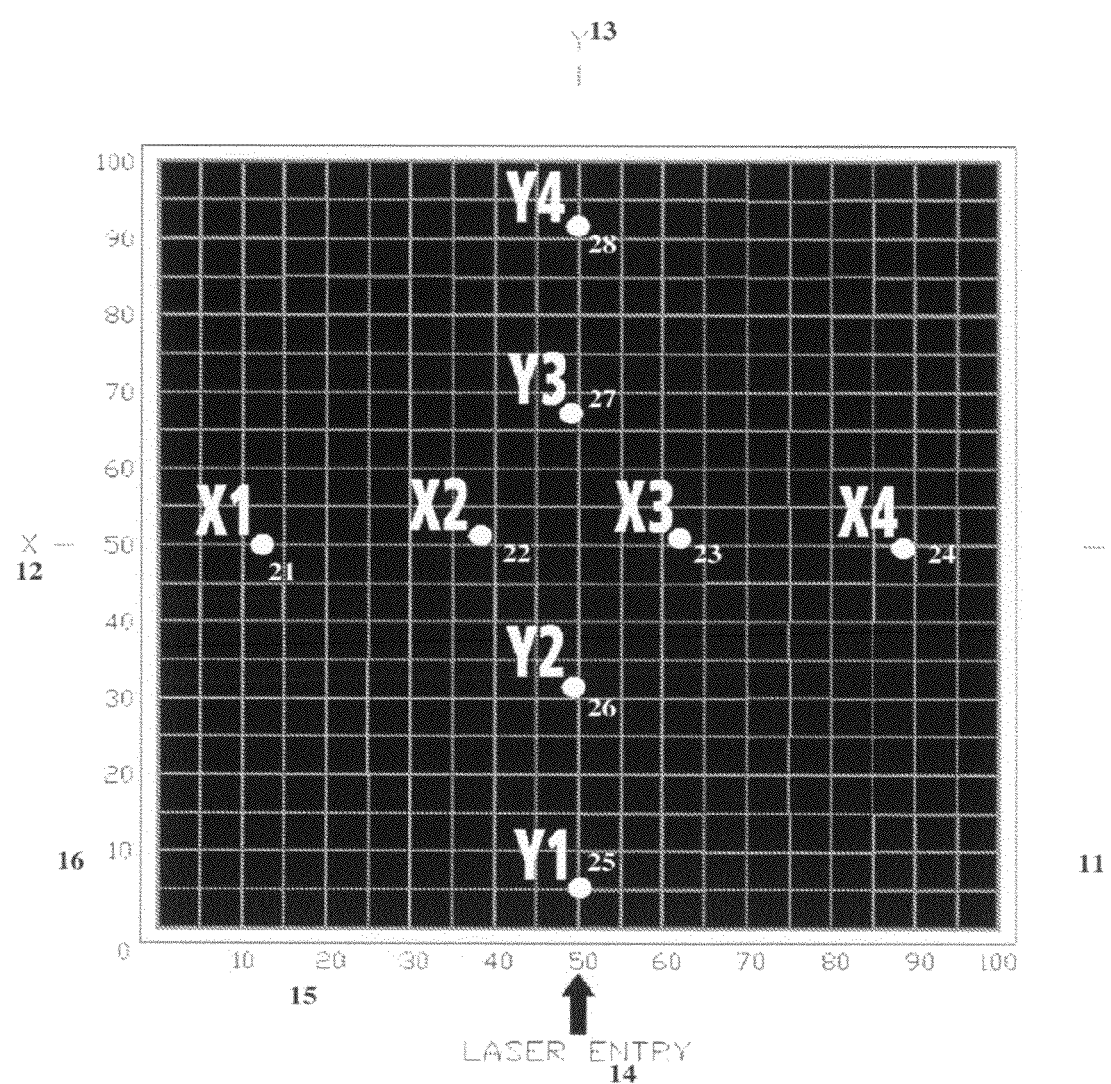
FIG. 9 is a plan diagram depicting one embodiment of a pre-calibrated target layout showing marks generated by logic means that an operator may identify and/or measure corresponding to their respective positions on said pre-calibrated target and input the results into said logic means that may be calculated by said logic means to adjust for and set the combined galvano motor central or middle scanning angle position/s or gain and/or individual galvano motor scale or offset/s.

As depicted in FIG. 9, the operator may then commence the third or first main stage of the alignment operation and may in this embodiment be by starting the third or first main stage of logic means representing a software or programme or 'Wizard' that may in this embodiment once completed the third or first main stage of setting the central rotational axes of each galvano motor by firing compatibly short durations of beam or laser beam with in this embodiment galvano motor control apparatus (not shown) steering a first or X galvano motor driven mirror attached to a first or X galvano motor and steered to deflect off a second or Y galvano motor driven mirror attached to a second or Y galvano motor and scanned or steered to mark at four positions (21, 22, 23, 24) in said first or X-axis with said second or Y galvano motor maintained in its central or middle scanning angle position and further scanned or steered to mark at four positions (25, 26, 27, 28) in said second or Y-axis with said first or X galvano motor maintained in its central or middle scanning angle position.

The operator may then identify, measure and input into said logic means the four positions (21, 22, 23, 24) marked on the pre-calibrated target (11) on the first or X-axis and the four positions (25, 26, 27, 28) marked on the pre-calibrated target (11) on the second or Y-axis to be calculated by said logic means to adjust for and set each galvano motor central or middle scanning angle position or gain and/or individual galvano motor scale or offset and linear correction against optical distortion generated by beam or laser beam, mounting and alignment intolerances to generate corrected galvano motor position control optical correction data reactive to the exact parameters of an individual laser, delivery optic/s, galvano motor scanning head and target plane set-up and without the need for any design parameters or data of the optics or optical set-up in use but without any correction for overall optical distortions generated by in this pre-objective scanning embodiment a flat-field or f-Theta or telecentric lens or lenses and their possible mounting intolerances.

Figure 10:
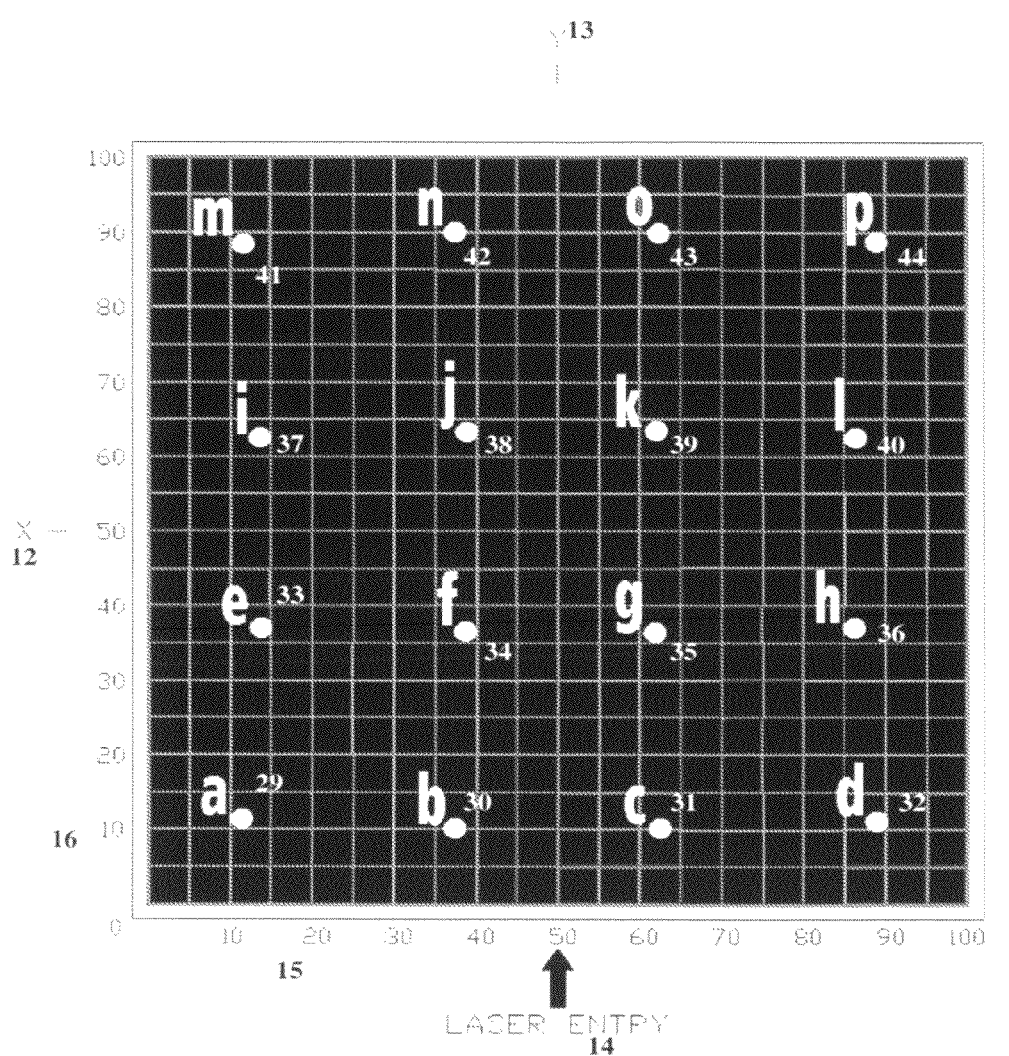
FIG. 10 is a plan diagram depicting one embodiment of a pre-calibrated target layout showing marks generated by logic means that an operator may identify and/or measure corresponding to their respective positions on said pre-calibrated target and input the results into said logic means that may be calculated by said logic means to adjust for optical distortions and set a combined galvano motor correction data to correct for said optical distortions.

As depicted in FIG. 10, the operator may then commence the fourth or second main stage of the correction operation and may in this embodiment be by starting the fourth or second main stage of logic means representing a software or programme or 'Wizard' that may in this embodiment once completed the fourth or second main stage of setting the complete reactive correction data into said logic means by firing compatibly short durations of beam or laser beam with in this embodiment galvano motor control apparatus (not shown) steering a first or X galvano motor driven mirror attached to a first or X galvano motor and steered to deflect off a second or Y galvano motor driven mirror attached to a second or Y galvano motor and said combined X galvano motor driven mirror attached to a first or X galvano motor and second or Y galvano motor driven mirror attached to a second or Y galvano motor scanned or steered to mark at sixteen positions (29, 30, 31, 32, 33, 34, 35, 36, 37, 38, 39, 40, 41, 42, 43, 44) on a pre-calibrated target (11).

The operator must then identify, measure and input into said logic means the sixteen positions (29, 30, 31, 32, 33, 34, 35, 36, 37, 38, 39, 40, 41, 42, 43, 44) marked on the pre-calibrated target (11) to be calculated by said logic means to virtually draw eight curves or arcs between corresponding marked positions where a first curve or arc may be by virtually tracing the connecting positions 29, 30, 31 and 32, a second curve or arc may be by virtually tracing the connecting positions 33, 34, 35 and 36, a third curve or arc may be by virtually tracing the connecting positions 37, 38, 39 and 40, a fourth curve or arc may be by virtually tracing the connecting positions 41, 42, 43 and 44, a fifth curve or arc may be by virtually tracing the connecting positions 29, 33, 37 and 41, a sixth curve or arc may be by virtually tracing the connecting positions 30, 34, 38 and 42, a seventh curve or arc may be by virtually tracing the connecting positions 31, 35, 39 and 43, and a final or eighth curve or arc may be by virtually tracing the connecting positions 32, 36, 40 and 44.

The logic means may then virtually plot additional positions on each curve or arc and virtual subdivisions between each curve or arc at a resolution possible by using said logic means to identify and then correct for the resulting optical distortions and apply the results to form optical distortion correction data.

Figure 11:
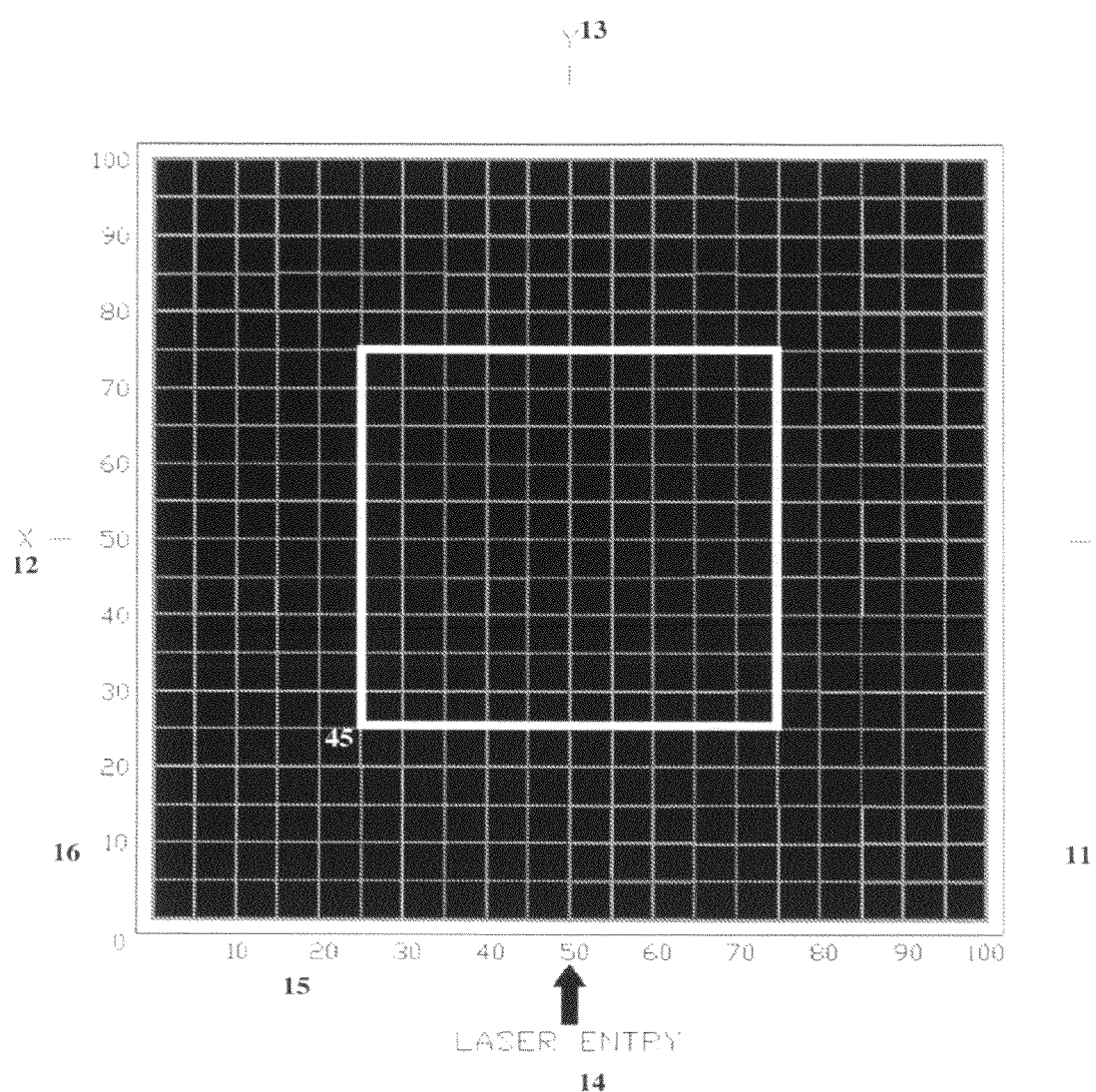
FIG. 11 is a plan diagram depicting one embodiment of a pre-calibrated target layout showing a design generated by logic means that an operator may identify and/or measure corresponding to it's size on said pre-calibrated target and input the results into said logic means that may be calculated by said logic means to adjust for and set the combined galvano motor scale/s of the optical distortion correction data.

As depicted in FIG. 11, the operator may then commence the final or fifth or third main stage of the correction operation and may in this embodiment be by starting the final or fifth or third main stage of logic means representing a software or programme or 'Wizard' that may in this embodiment once completed the final or fifth or third main stage of setting the complete reactive correction data into said logic means by firing compatible durations of beam or laser beam with in this embodiment galvano motor control apparatus (not shown) steering a first or X galvano motor driven mirror attached to a first or X galvano motor and steered to deflect off a second or Y galvano motor driven mirror attached to a second or Y galvano motor and said combined X galvano motor driven mirror attached to a first or X galvano motor and second or Y galvano motor driven mirror attached to a second or Y galvano motor scanned or steered to mark a design (45) on a pre-calibrated target (11).

The operator may then identify, measure and input into said logic means the size of said design (45) marked on the pre-calibrated target (11) to be calculated by said logic means to virtually re-scale the entire optical correction data within said logic means to generate final reactive optical correction data and if required in both the first or X direction and second or Y direction.

The final reactive optical correction data may then be transferred from identical system to identical system or apparatus if tight optical correction is not required or the entire process may be repeated for every system or apparatus where tighter optical correction is required.

From the foregoing description, one ordinarily skilled in the art can easily ascertain the essential characteristics of this invention and, without departing from the spirit and scope thereof, can make various changes and modifications to the invention to adapt it to various usages and conditions.

The invention claimed is:

1. A method for optically correcting field position distortions created by at least one scanning head comprising the steps of:
   (a) at least one of constructing, setting, and positioning a light beam generation apparatus to cause a beam of light to enter a scanning head and be deflected by optics and mirrors to a target plane;
   (b) executing a series of logic commands to generate marks using the beam of light and a scanning head control apparatus to set an optimum working distance and parallelity between the scanning head and the target plane;
   (c) at least one of constructing, setting, and positioning the scanning head and the target plane;
   (d) executing a series of logic commands to generate a predetermined number of marks per a first axis and a second axis using the beam of light and the scanning head control apparatus, wherein the marks are identified, measured, and inputted into a logic means, and wherein the logic means calculates adjustments and sets at least one of a central scanning angle position and scale for at least one motor;
   (e) executing another series of logic commands to generate a predetermined number of marks using the beam of light and the scanning head control apparatus, wherein the marks are identified, measured and inputted into a logic means, and wherein the logic means calculates adjustments for optical distortions and sets correction data for the at least one motor to correct for the optical distortions; and
   (f) executing another series of logic commands to generate a design using the beam of light and the scanning head control apparatus, wherein the design is identified, measured and inputted into a logic means, and wherein the logic means calculates, adjustments, and sets a scale of the optical distortion correction data for the at least one motor.

2. The method according to claim 1, wherein at least one of a galvano motor and a non-galvano motor is used to control the directional control of at least one of a steering and scanning of the beam of light.

3. The method according to claim 2, wherein at least one of the steering, scanning, and targeting of the beam of light is by at least one of pre-objective scanning, post-objective scanning, and complex scanning.

4. The method according to claim 1, wherein at least one of step (a), (b), and (f) is one of bypassed and not used.

5. The method according to claim 1, wherein the target plane includes a pre-calibrated target disposed thereon.

6. The method according to claim 1, wherein the predetermined number of marks per the first axis and the second axis in step (d) is four.

7. The method according to claim 1, wherein the predetermined number of marks in step (e) is sixteen.

8. The method according to claim 1, wherein three-dimensional reactive optical correction data is generated by at least one of a plurality of pre-calibrated targets, a three-dimensional pre-calibrated target, and a positional table used in a third direction.

9. A method for optically correcting field position distortions created by at least one galvano motor scanning head comprising the steps of:
   (a) at least one of constructing, setting, and positioning a beam of light generation apparatus to cause a beam of light to enter a galvano motor scanning head and be deflected by galvano motor driven optics and mirrors to a target plane having a pre-calibrated target disposed thereon;
   (b) executing a series of logic commands to generate marks on the pre-calibrated target using the beam of light and a galvano motor scanning head control apparatus to set an optimum working distance and parallelity between the galvano motor scanning head and the target plane;
   (c) at least one of constructing, setting, and positioning the scanning head and the target plane;
   (d) executing a series of logic commands to generate a predetermined number of marks on the pre-calibrated target per a first axis and a second axis using the beam of light and the galvano motor scanning head control apparatus, wherein the marks are identified, measured, and inputted into a logic means, and wherein the logic means calculates adjustments and sets at least one of a central scanning angle position and scale for at least one galvano motor;
   (e) executing another series of logic commands to generate a predetermined number of marks on the pre-calibrated target using the beam of light and the galvano motor scanning head control apparatus, wherein the marks are identified, measured and inputted into a logic means, and wherein the logic means calculates adjustments for optical distortions and sets correction data for the at least one galvano motor to correct for the optical distortions; and
   (f) executing another series of logic commands to generate a design on the pre-calibrated target using the beam of light and the galvano motor scanning head control apparatus, wherein the design is identified, measured and inputted into a logic means, and wherein the logic means calculates adjustments and sets a scale of the optical distortion correction data for the at least one galvano motor.

10. The method according to claim 9, wherein the at least one galvano motor is used to control the directional control of at least one of a steering and scanning of the beam of light.

11. The method according to claim 10, wherein at least one of the steering, scanning, and targeting of the beam of light is by at least one of pre-objective scanning, post-objective scanning, and complex scanning.

12. The method according to claim 9, wherein at least one of step (a), (b), and (f) is one of bypassed and not used.

13. The method according to claim 9, wherein the predetermined number of marks per the first axis and the second axis in step (d) is four.

14. The method according to claim 9, wherein the predetermined number of marks in step (e) is sixteen.

15. The method according to claim 9, wherein three-dimensional reactive optical correction data is generated by at least one of a plurality of pre-calibrated targets, a three-dimensional pre-calibrated target, and a positional table used in a third direction.

16. An apparatus for optically correcting field position distortions created by at least one scanning head comprising of:
- a scanning head adapted to receive a beam of light therethrough;
- a first mirror disposed in the scanning head to deflect the beam of light, the mirror driven by a first motor;
- a second mirror disposed in the scanning head to deflect the beam of light through at least one lens onto a target plane, the mirror driven by a second motor;
- at least one pre-calibrated target disposed on the target plane; and
- a scanning head control apparatus adapted to set an optimum working distance and parallelity between the scanning head and the target plane.

17. The apparatus according to claim 16, wherein at least one of the first motor and the second motor is one of a galvano motor and a non-galvano motor.

18. The apparatus according to claim 16, wherein the scanning head control apparatus and the beam of light are used to at least one of generate a predetermined number of marks on the pre-calibrated target to determine at least one of a central scanning angle position and scale for at least one of the first motor and the second motor, generate a predetermined number of marks on the pre-calibrated target to determine optical distortion correction data for at least one of the first motor and the second motor, and generate a design on the pre-calibrated target to determine a scale of the optical distortion data for at least one of the first motor and the second motor.

19. The apparatus according to claim 18, wherein the predetermined number of marks on the pre-calibrated target to determine at least one of a central scanning angle position and scale for at least one of the first motor and the second motor is four, and the predetermined number of marks on the pre-calibrated target to determine optical distortion correction data for at least one of the first motor and the second motor is sixteen.

20. The apparatus according to claim 16, wherein at least one of a plurality of pre-calibrated targets, a three-dimensional pre-calibrated target, and a positional table used in a third direction is used to generate three-dimensional reactive optical correction data.

* * * * *